United States Patent Office 3,100,700
Patented Aug. 13, 1963

3,100,700
RECOVERY OF NICKEL AND COBALT BY
REDUCTION AND LEACHING
Robert C. Hills, New York, N.Y., assignor to Freeport
Sulphur Company, New York, N.Y., a corporation of
Delaware
No Drawing. Filed Apr. 25, 1960, Ser. No. 24,240
5 Claims. (Cl. 75—63)

This invention relates to the recovery of nickel, and also cobalt if the same be present, contained in iron-bearing oxygenated mineral ores including silicate ores and other ores which have been brought to an oxidic form by roasting or an equivalent process. In a most important embodiment, it relates to a method of treating nickeliferous, lateritic serpentine type mineral either alone or in combination with nickeliferous, lateritic limonite ore whereby a high yield of nickel may subsequently be obtained therefrom by ammoniacal leaching, the process being especially adapted to those lateritic ores containing up to about 2 percent nickel which cannot be economically treated by the conventional smelting process ordinarily applied to high-grade nickel ores.

It has already been proposed in the literature that nickel be extracted from high-grade nickeliferous garnierite ore, in which the nickel occurs as a hydrated silicate containing nickel (about 6%) and usually also iron oxides, by heating the same at high temperatures in the presence of a reducing gas, and that the products obtained be treated with solutions of ammonium compounds to recover nickel. Whereas these prior processes are said to lead to the recovery of a substantial proportion of the nickel, they are not satisfactory for the treatment of low-grade ores, for the processes could not be operated to remove more than about 70 percent of the nickel content, thereby leaving much of the nickel in the residue from such treatment.

A modification of this prior process described in U.S. Patent No. 2,400,098 to Vas Hubert Brogdon and assigned to Nicaro Nickel Company involves as its feature the controlled simultaneous decomposition and reduction of hydrous silicate ore carried out by raising the temperature to a level between 1200° and 1400° F. at a rate not greater than about 6° F. per minute. This method has the disadvantage of requiring an elaborate furnace system to effect adequate control of temperatures and gas compositions, and of requiring means for supplying large amounts of reducing gas. In actual practice of said process on a large scale, it is difficult if not impossible to control the furnace conditions such as to secure recoveries of better than 70% of the nickel.

An object of the present invention is to secure a more complete reduction of the nickel of the serpentine content of the ore than has been possible by prior processes. Another object of the invention is to secure more complete selective reduction of the nickel and cobalt content of the ore than has heretofore been possible.

A further object is to make unnecessary the use of a producer gas or a reducing gas as such for reducing the nickel content of the core. Another object is to permit the use of simple furnace equipment or to increase the capacity of existing types of equipment.

An ultimate object is to provide a process whereby the quantity of nickel recovered from ores may be increased and whereby the nickel recovered from low-grade ores may amount to as much as 95% leaving as little as 0.2% or even 0.1% nickel in the residue.

Broadly expressed, the invention may be considered to involve processes for recovering nickel, and also cobalt if the same be present, from iron-bearing nickeliferous oxygenated ores and concentrated ores derived therefrom wherein the ore is heated in finely divided form in a non-oxidizing atmosphere in the presence of a hydrocarbon, preferably a hydrocarbon oil or other mixture, added to the ore, up to and at a temperature at which the nickel (and cobalt if present) is reduced to a form selectively soluble and leachable from the iron content in a leaching step later to be applied, the amount of hydrocarbon used being carefully controlled such that it is adequate to reduce the nickel and cobalt content but not the iron to the soluble state, and after said reduction step is completed the ore is cooled and leached in known manner. The reduced mass is particularly amenable to the selective recovery action of known ammoniacal leach operations accompanied by aeration wherein the reduced nickel and cobalt contents are dissolved and are separated from the gangue containing the iron.

The process of the invention is applicable to the treatment of iron-bearing nickeliferous oxygenated ores in general and concentrates derived therefrom. It is particularly applicable to low-grade lateritic, serpentine and limonite ores and mixed ores containing both of these minerals. It is also applicable to asbolite ores such as are found in New Caledonia and concentrates of the same.

The leaching processes of the present invention are applicable to oxidic minerals other than those hereinbefore disclosed including ores found in Brazil, Venezuela, New Caledonia, the Philippines, and Indonesia.

The hydrocarbons operable in the present invention may be any such non-gaseous compound or mixture of compounds of sufficiently high molecular weight or low volatility that the hydrocarbon is not vaporized off before the temperature employed in effecting the reduction is reached. The preferred hydrocarbon is Bunker C fuel oil, this oil not only being effective in accomplishing the desired reduction but also it is low in cost. Other hydrocarbons at least as heavy as those classified as fuel oils may also be employed including lubricating and cylinder oils. Another important class of hydrocarbons are bituminous materials which liquefy at some temperature below about 600° F. but do not volatilize appreciably below this temperature and which liquefy during the step of heating and reducing the nickel and cobalt, examples of these solid or semi-solid materials being residues and natural products such as asphalts, asphaltites, tars, pitches, and mineral waxes. Furthermore, coal, either hard or soft, and other solid hydrocarbons may be employed, but these solids are less efficient than the other hydrocarbons mentioned.

The amount of hydrocarbon used in any particular operation depends generally upon the amount of nickel, cobalt and iron present in the ore being treated. The amount preferably utilized may be described as that amount of hydrocarbon which will bring about the reduction of the nickel and cobalt content to a leachable state while leaving the iron in a state insoluble in the leach solution to be used. With the proper amount of hydrocarbon present, the nickel and cobalt but not the iron will be reduced to the metallic state or substantially to such state. If excessive hydrocarbon is present the iron also will be reduced to the metallic form or to a form also soluble in the leach solution. The amount can be approximated by calculating the quantity of hydrocarbon required to provide the reducing action required to convert the nickel and cobalt compounds to metallic nickel and the ferric oxide to ferroso-ferric oxide through balanced equations recording the chemical reactions involved. Since the theoretical reducing action is not quantitatively attained, an excess of hydrocarbon is actually required. The optimum amount of hydrocarbon which should be used in any specific operation of the process can be determined by test.

For the hydrocarbon oils, the operable range generally falls within about 1–7% based on the dry weight of the ore. From 2–5% may be considered the range ordinarily required. With some solid fuels containing hydrocarbons, larger quantities of the solids are required.

Adequate mixing of the hydrocarbon with the ore can be achieved by grinding together or by tumbling in a cement mixer, pug mill or other similar device. The oil may alternatively be sprayed upon a thin moving layer of the ore upon a conveyor belt. While very intimate mixing is desirable from the standpoint of economy of hydrocarbon use, a slight increase in quantity of hydrocarbon will compensate to a considerable extent for poor mixing. If it is desired to reduce the size of the particles of the ore, the oil may be incorporated while conducting this grinding operation. By another method the ore may be screened to provide a fine fraction and a coarse fraction. Next the coarse fraction is mixed with the hydrocarbon and then ground to the fine size ultimately desired, below about −100 mesh. Oil may then be added to the fine fraction and the mixture ground without particle size reduction after which the two fractions are subjected to the reduction treatment, either separately or together.

The heating step of the present invention, wherein the reduction is accomplished, must be carried out in a non-oxidizing atmosphere. This heating is preferably performed by bringing hot flue or combustion gases into direct contact with the hydrocarbon-ore mixture while the latter is in bed form. This can suitably be accomplished while the ore is passing through the rabbled ore beds of multiple-hearth furnaces or in the moving beds of ore in rotary kilns. Through this procedure, the reducing conditons created by the presence of the decomposing hydrocarbon at the high temperatures employed are maintained in contact with the ore particles to be reduced for an adequate period for the reduction to take place. The heating operation, however, may be effected by indirect heat transfer or by a combination of direct and indirect heating. Finally, the direct heating may be accomplished with reducing gases or combustion gases containing reducing gases but with econmic disadvantage, even though the amount of oil required might be lessened by the reducing action of the gases, the oil being the cheaper source of reducing power.

To accomplish the reduction, the hydrocarbon-ore mixture is heated to a temperature above 600° F., sufficient to reduce the nickel to the metallic state or to the form selectively leachable from the iron content in the leaching solution to be subsequently employed. When the nickel to be recovered is contained in limonite ore, the temperature can be from about 600° to 1500° F. However, when the nickel is contained in serpentine or siliceous ores the minimum temperature is about 1000° F. A function of the heating in connection with the treatment of the serpentine ore is the decomposition of the silicate to the oxide form. With either type of ore, the preferred range is from about 1200° to 1500° F. During the heat treatment high temperatures causing sintering or "sticking" of the ore should be avoided, for the leaching operation later to be employed requires that the reduced ore still be in finely divided condition such that access to the reduced nickel and cobalt may be had by the leach solution.

The period of time during which the ore should be heated to accomplish the reduction depends upon several factors including the condition or content of the ore and the apparatus used. Ordinarily, a period between 20 minutes and 3 hours will accomplish the desired action.

In accordance with a specific embodiment of the invention the oil used, as Bunker C, contains from 1–5% sulfur. The sulfur improves the selective reduction and conditioning of the nickel and cobalt content during the heating operation. Certain hydrocarbon oils contain sulfur and may be used as such, or hydrocarbons relatively free of sulfur may be mixed with sulfur or with metallic sulfides or with other sulfur-bearing compounds to provide the sulfur-oil mixture for operation of the process. Larger amounts of sulfur can be employed to advantage under some circumstances and the optimum amount of sulfur for any particular oil or ore can be readily determined by laboratory tests.

Upon completion of the reduction operation the ore is cooled to a temperature at which the leaching operation is to be carried out, it being desirable to effect the cooling in an oxygen-free atmosphere. Cooling to a temperature below approximately 150° F. is normally desirable.

In accordance with the preferred embodiment of the invention, the selective leaching of the nickel and cobalt content is obtained through the application of an ammoniacal liquor accomapnied by aeration. No invention, however, is here claimed in any particular leach solution or ammoniacal solution. Any of the ammoniacal liquors described in the prior art may be employed but the preferred liquor contains basic ammonium compounds inasmuch as their volatility facilitates their later recovery for reuse in the process. A liquor working satisfactorily and with good results in the treatment of most ores is composed of an aqueous solution containing about 6% by weight of ammonia, half of which is present in the form of the hydroxide and the other half in the form of the carbonate.

The ammoniacal pulp obtained by the mixing of the reduced ore with the liquor is then aerated to effect dissolution of the nickel and any cobalt present, the aeration supplying the oxygen necessary to bring about the dissolution. From the aerated liquor, the nickel and cobalt can be recovered in the form of precipitated carbonates or hydroxides, or a mixture of the two by distilling off the ammonia.

*Example 1*

Five hundred grams of a nickeliferous iron ore of mixed limonite and serpentine character containing 40.2 percent iron, 1.27 percent nickel, and 0.124 percent cobalt together with other minerals which do not interfere with the operation of the present process were dried and crushed to pass a ¼ inch mesh screen. Twenty-five grams of Bunker C oil were then added to the ore and the ore was ground to a fineness of approximately 100 mesh and next heated in a vertical retort to a temperature of 1400° F. This temperature was maintained for 90 minutes after which the reduced ore was cooled out of contact with air.

The cooled ore was then mixed with the ammoniacal solution hereinbefore specifically described, the proportion of solid to liquid being about 1 to 4 in weight. Thereupon the pulp was aerated with air at a rate of 100 cc. per minute for two hours after which the solids were filtered off and mixed with a fresh supply of ammonia liquor. The leaching was carried out in this fashion successively three times and the leach liquors were then steam distilled to remove the ammonia thereby precipitating the nickel and cobalt values. The precipitate was then separated from the water by simple filtration, whereupon it was washed and dried at a temperature of 105° F. Yield of nickel as nickel carbonate was 85.2 percent and that of cobalt carbonate 62.5 percent.

*Example 2*

A 500-gram portion of another nickeliferous iron ore of limonite character containing 40.2 percent iron, 1.30 percent nickel, and 0.127 percent cobalt oxide is dried and crushed to pass a ¼ inch mesh screen. It is then screened on a 30 mesh screen which separates the ore into two fractions; the minus 30 mesh fraction amounting to 400 grams and the plus 30 mesh fraction amounting to 100 grams. The 100-gram coarse fraction is then mixed with 10 grams of Venezuelan crude oil from which the fractions more volatile than diesel oil had been removed by distillation. The coarse fraction with the oil is next ground to a fineness of approximately 100 mesh and mixed with the 400 grams of minus 30 mesh material. The 500-gram ore mixture containing 10 grams of oil is then reduced and extracted as given in Example 1. Nickel yield, 89.2 percent. Cobalt yield, 70.1 percent. These two ore fractions could have been reduced separately if different temperatures had been found to give better results on the two fractions. The reduced fractions could also have been leached either mixed or separately.

*Example 3*

Another 500-gram portion of ore similar to that used in Example 2 is treated in the same manner as given in Example 1 except that 20 grams of Pennsylvania crude oil, low in sulfur, from which fractions more volatile than diesel oil had been removed by distillation and having 1.0 gram of powdered sulfur added to it is used. The yield of nickel, 84.2 percent, and that of cobalt, 68.5 percent.

*Example 4*

A one thousand gram sample of undried nickeliferous serpentine ore containing 15.85 percent iron and 1.78 percent nickel was dried, ground to minus 60 mesh size and mixed with 40 grams of Cuban asphalt and 10 grams of iron pyrite. The sample was placed in a vertical retort, swept with nitrogen and heated to roasting temperature. The temperature rise rate up to 1000° F. was about 15° F. per minute. The temperature rise rate was then adjusted so that the maximum temperature of 1700° F. was attained in approximately one hour and fifteen minutes. The cooled ore was then leached with an ammoniacal-ammonium carbonate liquor, aerated for one and one-half hours and further treated for the recovery of nickel as described in Example 1 of the specification. Nickel recovery amounted to 98.0 percent.

*Example 5*

A one thousand gram sample of undried serpentine, the same as that treated in Example 4, was dried, ground to minus 60 mesh size, mixed with 40 grams of Cuban asphalt and 10 grams of iron pyrite (FeS₂). The sample was placed in a vertical retort, swept with nitrogen and roasted. The sample was heated at the rate of 15° F. per minute to 1000° F. The temperature rise rate was then adjusted so that a maximum temperature of 1500° F. was attained in one hour and fifteen minutes. The sample was maintained at this temperature for fifteen minutes, then cooled and treated according to the procedure of Example 4. Nickel recovery amounted to 94.5 percent.

As compared with the process of the hereinbefore mentioned Brogdon patent, the process of the present invention has the advantage that no control of the rate of temperature rise is necessary. Also the process of the invention permits the use of simple types of furnaces such as rotary kilns in place of the elaborate multiple-hearth furnaces required in the stated earlier process.

In comparison with related prior art in general, the process of the present invention has the advantage of securing a better reduction of the nickel of the serpentine content of ores containing such minerals and the advantage of securing selective reduction of the nickel and cobalt content of any of the ores herein described more conveniently than has heretofore been possible.

Finally, the process of the present invention has a decided advantage in making unnecessary the use of producer gas or a reducing gas as such for reducing the nickel and cobalt content of any of the ores herein described.

Although the invention has been described as a process designed to effect reduction of none of the iron to a form which would be leached along with the nickel and any cobalt present, it should be understood that the claimed process could be operated in such manner as will permit some portion of the iron to be reduced provided such iron can be economically separated from the nickel and cobalt in the product leach liquor which would be obtained.

The selective reduction and conditioning of the nickel and cobalt content during the heating operation is substantially improved by incorporating sulfur, or a compound supplying sulfur, in a quantity of 1–15% based on the weight of the hydrocarbon employed. The sulfur may be supplied as free sulfur, metal sulfides, or other sulfur-bearing compounds.

This application is a continuation-in-part of applicant's allowed application Serial No. 702,834 filed December 16, 1957, now forfeited.

It should be understood that the present invention is not limited to the specific details herein set forth but that it extends to all equivalent ores, conditions and procedures which will occur to those skilled in the art upon consideration of the terms and scope of the claims appended hereto.

I claim:

1. A process for the recovery of nickel and cobalt from iron-bearing cobalt-containing nickeliferous oxygenated ores and concentrated ores derived therefrom which comprises, mixing with the ore in finely divided form a hydrocarbon which is a liquid at some temperature below about 600° F. and does not volatilize appreciably below this temperature, heating the resulting mixture in a non-oxidizing atmosphere to a temperature above 600° F. thereby liquefying said hydrocarbon and reducing the nickel and cobalt to a form selectively leachable from the iron content in the solvent to be subsequently employed, the amount of hydrocarbon employed being sufficient to reduce the nickel content and any cobalt present but not the iron to said leachable form, cooling the still finely divided ore and selectively leaching the reduced nickel and any cobalt present, in a substantially iron-free condition, from the cooled ore.

2. A process for the recovery of nickel and cobalt from iron-bearing cobalt-containing nickeliferous oxygenated ores and concentrated ores derived therefrom which comprises, mixing a liquid hydrocarbon of such low volatility that it is not vaporized off before the reduction temperature hereinafter specified is reached with the ore in finely divided state in a proportion of from about 1% to 7% of the ore, by weight, heating the resulting mixture in a non-oxidizing atmosphere to a temperature above 600° F. at which and until the nickel content has been reduced to a form selectively leachable from the iron content by means of the selective solvent to be subsequently employed, cooling the still finely divided ore and selectively leaching the reduced nickel and any cobalt present, in a substantially iron-free condition, from the cooled ore.

3. A process for the recovery of nickel and cobalt from iron-bearing cobalt-containing nickeliferous oxygenated ores and concentrated ores derived therefrom which comprises, mixing a liquid hydrocarbon oil at least as heavy as fuel oil with the ore in finely divided state in a proportion of from about 1% to 7% of the ore, by weight, heating the resulting mixture in a non-oxidizing atmosphere to a temperature of from about 600° to 1500° F. until the nickel content has been reduced to a form soluble in ammoniacal leach solution accompanied by aeration, cooling the still finely divided ore and separating the reduced nickel and any reduced cobalt present from the iron by leaching with an ammoniacal leach solution accompanied by aeration.

4. A process for the recovery of nickel and cobalt from iron-bearing cobalt-containing nickeliferous oxygenated ores and concentrated ores derived therefrom which comprises, heating the ore in finely divided condition in bed form in a non-oxidizing atmosphere in the presence of a liquid hydrocarbon oil mixed therewith up to and at a temperature of from 600° to 1500° F. until the nickel is reduced to a form leachable in the leaching solution hereinafter specified, the amount of hydrocarbon oil employed being sufficient to reduce the nickel content and any cobalt present but not the iron to said leachable form, cooling the still finely divided ore and separating the reduced nickel and any reduced cobalt present from the iron by leaching with an ammoniacal leach solution accompanied by aeration.

5. A process for the recovery of nickel and cobalt from iron-bearing cobalt-containing lateritic ores containing serpentinic nickel and from concentrated ores derived therefrom which comprises, heating the ore in finely divided form in a non-oxidizing atmosphere and in the presence of a bituminous meltable hydrocarbon mixed therewith, up to and at a temperature of from 1000° to 1500° F. thereby liquefying said hydrocarbon and reducing the nickel and cobalt to a form selectively leachable from the iron content in the leaching solution to be subsequently employed, the amount of hydrocarbon employed being sufficient to reduce the nickel content and any cobalt present but not the iron to said leachable form, cooling the still finely divided ore and selectively leaching the reduced nickel and any cobalt present, in a substantially iron-free condition, from the cooled ore.

References Cited in the file of this patent

UNITED STATES PATENTS

| | | |
|---|---|---|
| 55,710 | Reese | June 19, 1866 |
| 1,717,160 | Kichline | June 11, 1929 |
| 2,142,926 | Van Es | Jan. 3, 1939 |
| 2,994,601 | Greene | Aug. 1, 1961 |